(12) United States Patent
Petersen

(10) Patent No.: US 7,579,754 B2
(45) Date of Patent: Aug. 25, 2009

(54) PIEZOELECTRIC ACTUATOR

(75) Inventor: Carl C. Petersen, Mentor, OH (US)

(73) Assignee: Channel Products, Inc., Chesterland, OH (US)

( * ) Notice: Subject to any disclaimer, the term of this patent is extended or adjusted under 35 U.S.C. 154(b) by 432 days.

(21) Appl. No.: 11/406,925

(22) Filed: Apr. 20, 2006

(65) Prior Publication Data

US 2007/0247031 A1    Oct. 25, 2007

(51) Int. Cl.
*H01L 41/04* (2006.01)
*H01L 41/08* (2006.01)

(52) U.S. Cl. .................. 310/328; 310/355; 310/354; 310/353

(58) Field of Classification Search ........... 310/311, 310/328, 353–355
See application file for complete search history.

(56) References Cited

U.S. PATENT DOCUMENTS

| | | | |
|---|---|---|---|
| 4,435,666 A * | 3/1984 | Fukui et al. ............... | 310/328 |
| 4,983,876 A * | 1/1991 | Nakamura et al. .......... | 310/328 |
| 7,119,478 B1 * | 10/2006 | Mentesana ................. | 310/328 |

\* cited by examiner

*Primary Examiner*—Jaydi SanMartin
(74) *Attorney, Agent, or Firm*—James A. Hudak

(57) ABSTRACT

A piezoelectric actuator that can be operated in the d31 mode and which controls the potential energy of a spring is disclosed. The d31 mode of operation provides large actuator displacement and the potential energy of the spring significantly increases the force and work produced by the actuator. In a first embodiment, a single piezoelectric element, operating in the d31 mode, controls the potential energy of the spring. In another embodiment, two piezoelectric elements, both operating in the d31 mode, control the potential energy of the spring.

14 Claims, 6 Drawing Sheets

PIEZOELECTRIC ACTUATOR

TECHNICAL FIELD

The present invention relates, in general, to a piezoelectric actuator and, more particularly, to a piezoelectric actuator that controls the potential energy of a spring to increase the force and work provided by the actuator.

BACKGROUND ART

There are various types of actuators that incorporate piezoelectric elements. These actuators utilize different modes of operation, referred to in the industry as the d33 or d31 operating modes, depending upon the direction of expansion or contraction of the piezoelectric material relative to the direction of the electric field that is applied to same. The relative displacement of the piezoelectric material in the d33 mode of operation is approximately two times greater than the displacement of same in the d31 operating mode. Displacement of piezoelectric material in the d33 operating mode is in the form of expansion in the same direction as the applied electrical field and poling direction, whereas displacement of such material in the d31 operating mode is in the form of contraction in a direction perpendicular to the applied electrical field and poling direction.

Stack type piezoelectric actuators (d33 actuators) are solid-state linear devices. As such, these actuators utilize the expansion of piezoelectric material to produce a positive displacement. In general, the active part of these actuators consists of a stack of ceramic layers separated by thin metallic layers which act as electrodes. A typical stack type actuator may produce a deflection of about 0.002 inches, a force of about 200 lbs. and work of about 0.4 in-lbs. Thus, d33 mode actuators provide a large amount of work, however, they require a relatively complex assembly, a large package size, and a sophisticated, high cost power supply. In addition, these actuators possess excessive capacitances and hysteresis. Furthermore, these actuators are relatively expensive to produce and are heavy.

Contraction type actuators (d31 actuators) utilize the contraction of piezoelectric material to produce a negative displacement. The piezoelectric material when bonded to a metallic strip exhibits a bending motion as it contracts. A bending type d31 mode actuator may consist of a single layer of piezoelectric material bonded to a metallic strip or several layers of bonded pairs. The displacement of such material provided by d31 actuators, which is perpendicular to the direction of the applied electrical field, is a function of the length of the actuator. The number of ceramic layers utilized determines the resulting stiffness and output force of the actuator. The layers or "bimorph" strips can produce a relatively large deflection in a relatively small, low cost package, however, these actuators are severely limited in their ability to produce a force. For example, a typical d31 mode actuator may produce a deflection of about 0.1 inches, a force of about 0.08 lbs. and work of about 0.008 in-lbs. Because these actuators are severely limited in their ability to produce force, they cannot be used in those applications that require a relatively large force, such as 1-100 pounds.

In view of the foregoing, it has become desirable to develop a piezoelectric actuator that can be operated in the d31 mode to obtain the deflection advantages of this operating mode and which controls the potential energy of a spring to increase the force and work produced by the actuator.

SUMMARY OF THE INVENTION

The present invention solves the problems associated with prior art piezoelectric actuators and other problems by providing a piezoelectric actuator that can be operated in the d31 mode and which controls the potential energy of a spring to increase the force and work produced by the actuator. The d31 mode of operation provides relatively large actuator displacement and the spring significantly increases the force and work provided by the actuator. In a first embodiment of the present invention, a single piezoelectric element, operating in the d31 mode, controls the potential energy of a spring. In another embodiment of the present invention, two piezoelectric elements, both operating in the d31 mode, control the potential energy of a spring.

DESCRIPTION OF THE PREFERRED EMBODIMENT

Figure 1:
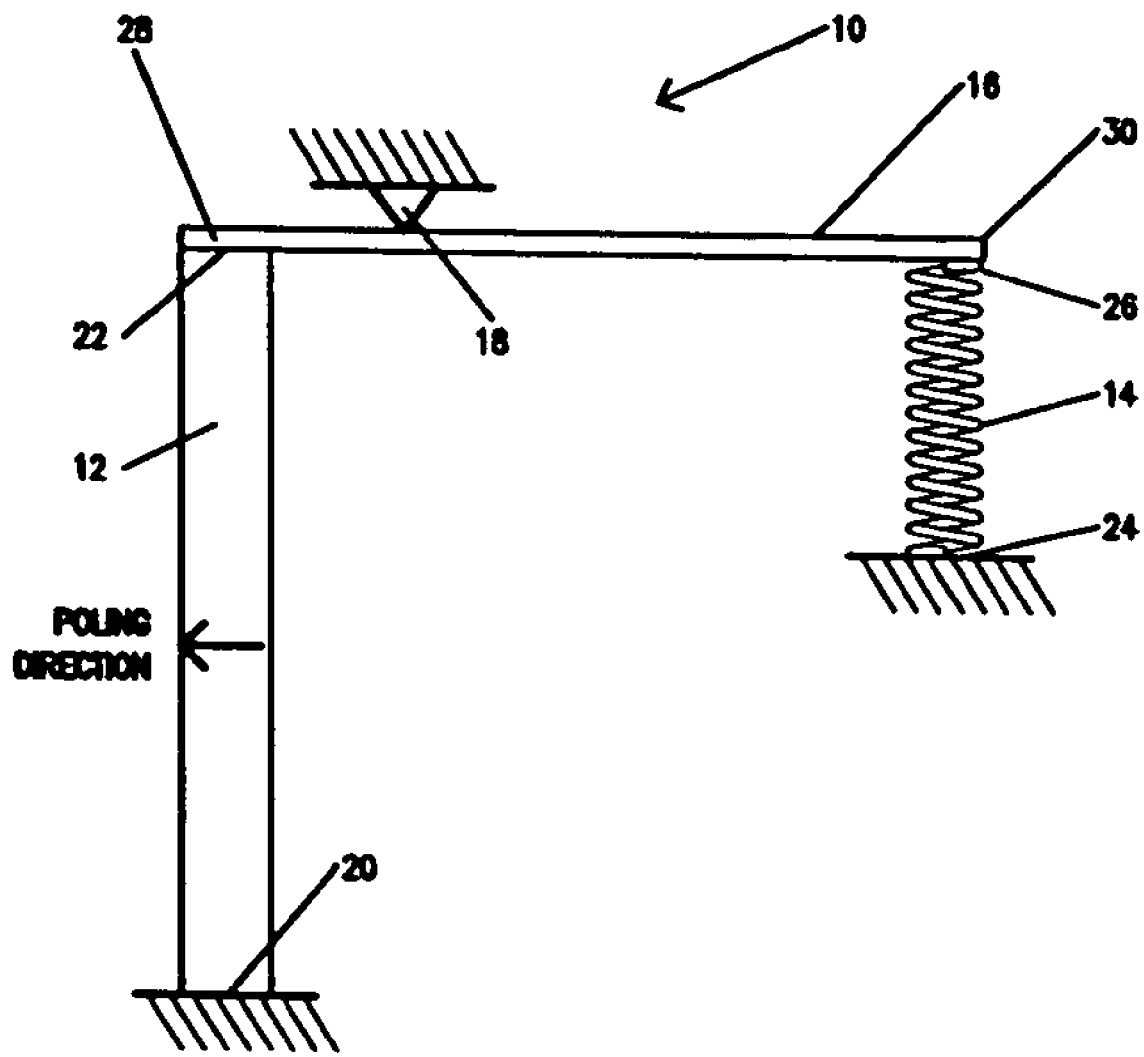
FIG. 1 is a front elevational view of a first embodiment of the present invention showing the orientation of a single piezoelectric element and a spring when no voltage has been applied to the piezoelectric element.

Referring now to the drawings where the illustrations are for the purpose of describing the preferred embodiment of the present invention and are not intended to limit the invention described herein, FIG. 1 is a front elevational view of a first embodiment of the piezoelectric actuator 10 of the present invention. The piezoelectric actuator 10 is comprised of a piezoelectric element 12, a spring 14, a connecting arm 16 and a fulcrum 18.

The length of piezoelectric element 12 is greater than the width and/or thickness of element 12. The width and thickness of piezoelectric element 12 may be the same or may be different. The piezoelectric element 12 may be comprised of two substantially concentric rings forming a hollow tubular structure. Alternatively, the piezoelectric element 12 may be comprised of two substantially concentric polygons forming a hollow structure having a generally uniform or non-uniform wall thickness.

One end 20 of the piezoelectric element 12 is fixed whereas the oppositely disposed end 22 of piezoelectric element 12 is free. Similarly, one end 24 of spring 14 is fixed whereas the oppositely disposed end 26 of spring 14 is free. The spring 14 has an initial pre-load applied thereto. One end 28 of connecting arm 16 contacts end 22 of piezoelectric element 12 and the other end 30 of connecting arm 16 contacts end 26 of spring 14. Fulcrum 18 contacts connecting arm 16 intermediate its ends 28, 30. In FIG. 1, no voltage has been applied to piezoelectric element 12.

Figure 2:
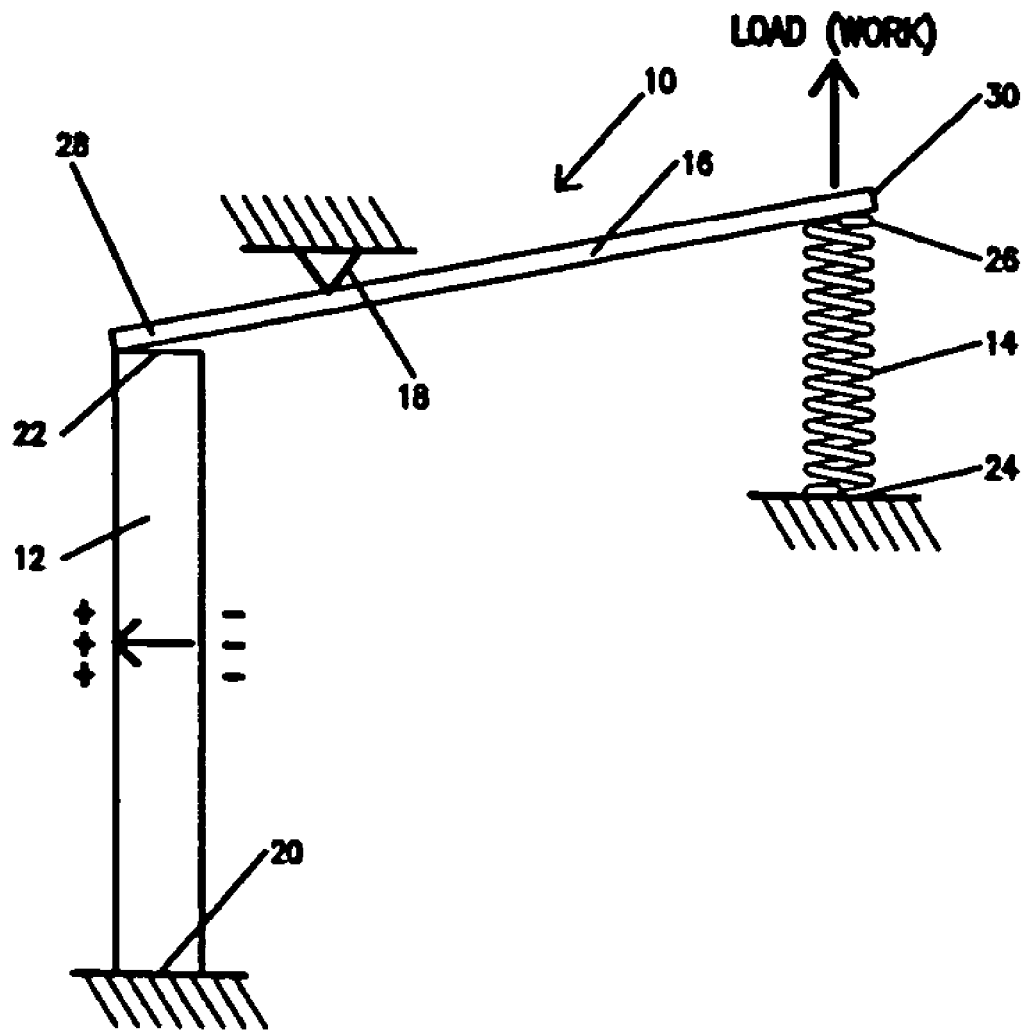
FIG. 2 is a front elevational view of the embodiment of the present invention shown in FIG. 1 and illustrates the orientation of the piezoelectric element and the spring when a voltage has been applied to the piezoelectric element.

FIG. 2 is a front elevational view of the piezoelectric actuator 10 shown in FIG. 1 and illustrates the orientation of the piezoelectric element 12, spring 14 and connecting arm 16 after a voltage has been applied perpendicularly to the longitudinal axis of the piezoelectric element 12. Application of a voltage perpendicularly to the longitudinal axis of the piezoelectric element 12, i.e., in the d31 mode, causes the piezoelectric element 12 to contract which, in turn, causes the connecting arm 16 to rotate counterclockwise about fulcrum 18 resulting in spring 14 applying its pre-load to an object (not shown) via end 30 of connecting arm 16. The connecting arm 16 acts as a lever about fulcrum 18 and, depending upon the position of the point of contact of fulcrum 18 on connecting arm 16, effectively "multiplies" the pre-load force on spring 14.

Figure 3:
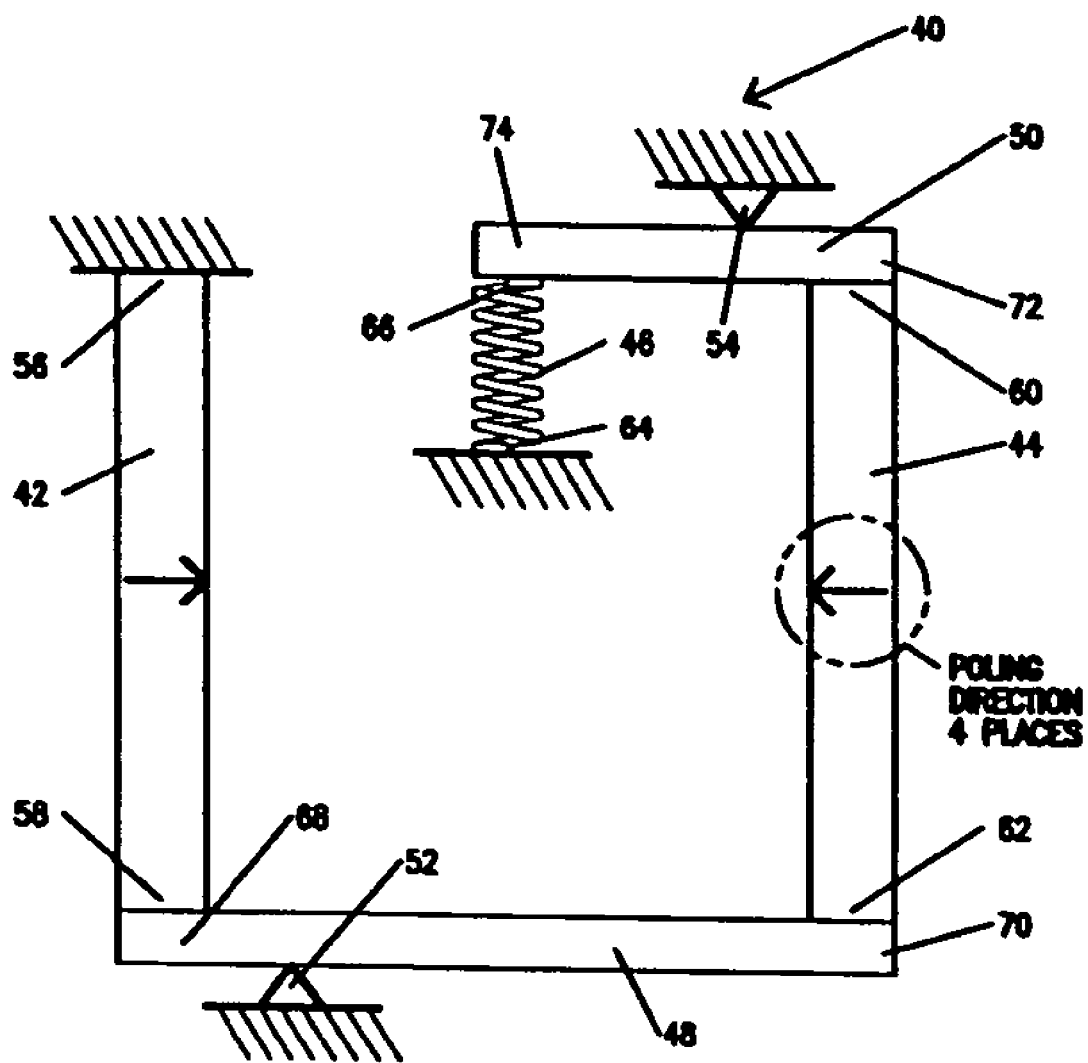
FIG. 3 is a front elevational view of another embodiment of the present invention showing the orientation of two piezoelectric elements and a spring when no voltage has been applied to the piezoelectric elements.

Referring now to FIG. 3, a front elevational view of another embodiment of the piezoelectric actuator 40 of the present invention is illustrated. The piezoelectric actuator 40 is comprised of piezoelectric elements 42, 44, a spring 46, connecting arms 48, 50 and fulcrums 52, 54. As in the process embodiment, the length of the piezoelectric elements 42, 44 is greater than the width and/or thickness of same. The width and thickness of each piezoelectric element 42, 44 may be the same or may be different. The piezoelectric elements 42, 44 may be comprised of two substantially concentric rings forming a hollow tubular structure. Alternatively, the piezoelectric elements 42, 44 may be comprised of two substantially concentric polygons forming a hollow structure having a generally uniform or non-uniform wall thickness.

One end 56 of piezoelectric element 42 is fixed whereas the oppositely disposed end 58 of piezoelectric element 42 is free. With respect to piezoelectric element 44, both ends 60, 62 are free. One end 64 of spring 46 is fixed whereas the oppositely disposed end 66 of spring 46 is free. The spring 46 has an initial pre-load applied thereto. One end 68 of connecting arm 48 contacts end 58 of piezoelectric element 42 and the other end 70 of connecting arm 48 contacts end 62 of piezoelectric element 44. Fulcrum 52 contacts connecting arm 48 intermediate its ends 68, 70. One end 72 of connecting arm 50 contacts end 60 of piezoelectric element 44 and the other end 74 of connecting arm 50 contacts end 66 of spring 46. Fulcrum 54 contacts connecting arm 50 intermediate its ends 72, 74. In FIG. 3, no voltage has been applied to piezoelectric elements 42, 44.

Figure 4:
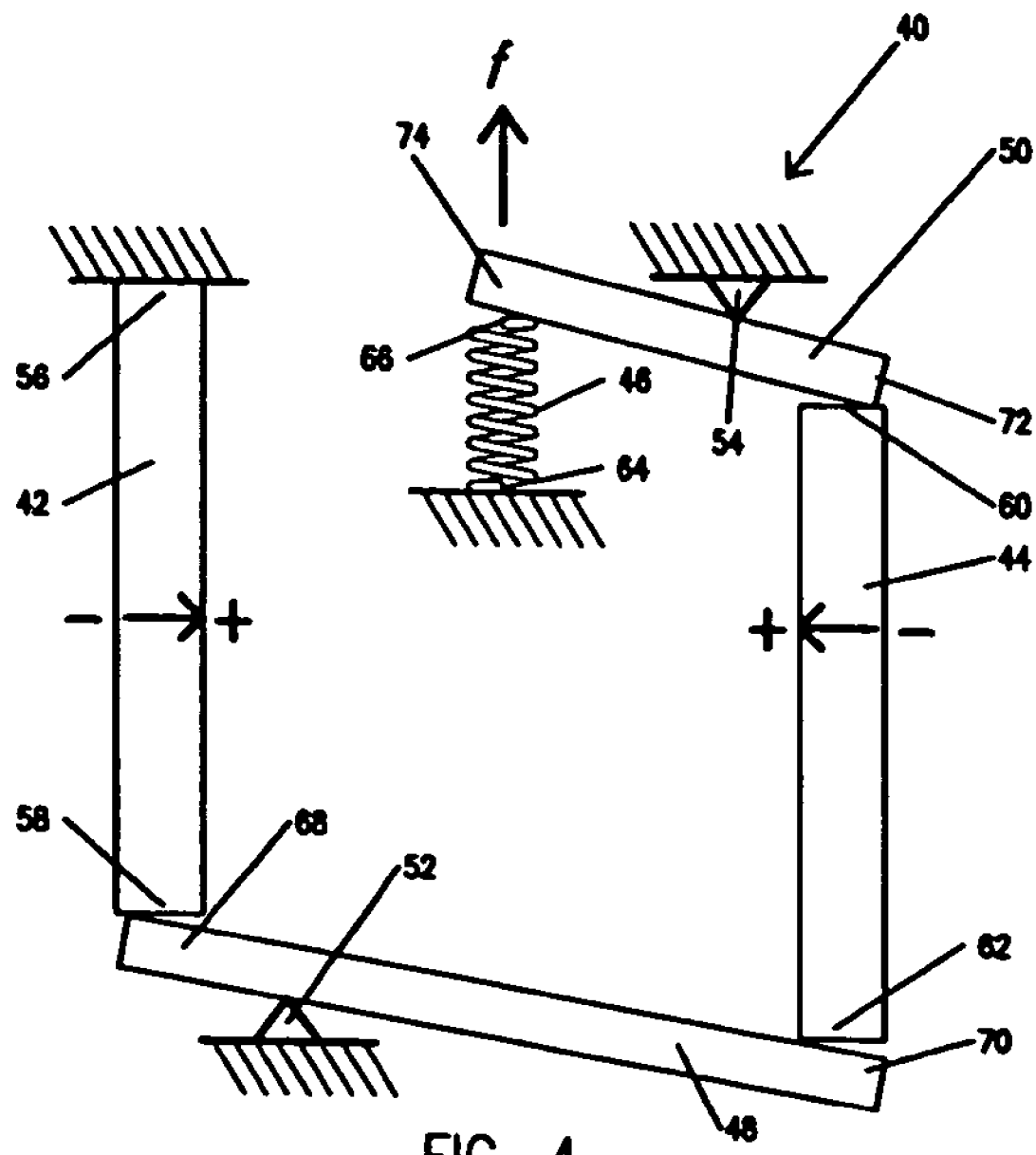
FIG. 4 is a front elevational view of the embodiment of the present invention shown in FIG. 3 and illustrates the orientation of the two piezoelectric elements and the spring when a voltage has been applied to the piezoelectric elements.

FIG. 4 is a front elevational view of the piezoelectric actuator 40 shown in FIG. 3 and illustrates the orientation of the piezoelectric elements 42, 44, spring 46, and connecting arms 48, 50 after a voltage has been applied perpendicularly to the longitudinal axis of the piezoelectric elements 42, 44, i.e., in the d31 mode. The application of such a voltage causes the piezoelectric elements 42, 44 to contract which, in turn, causes the connecting arms 48, 50 to rotate clockwise about their respective fulcrums 52, 54, resulting in spring 46 applying its pre-load to an object (not shown) via end 74 of connecting arm 50. The connecting arms 48, 50 act as levers about their respective fulcrums 52, 54 and, depending upon the position of the point of contact of fulcrums 52, 54 on their respective connecting arms 48, 50, effectively "multiplies" the pre-load force on spring 46.

Figure 5:
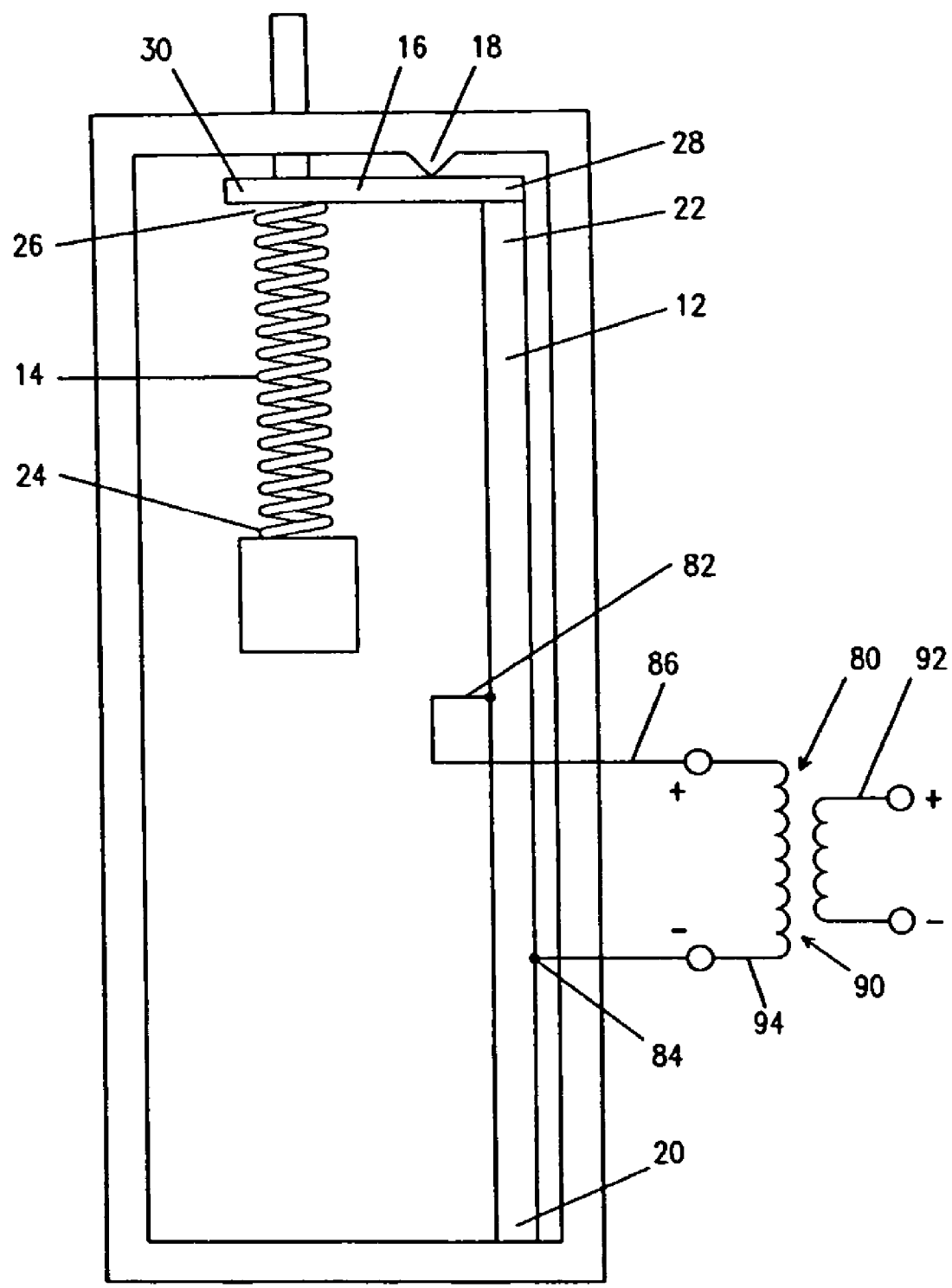
FIG. 5 is an electrical schematic illustrating the apparatus utilized to apply an electrical field to the piezoelectric element utilized in the embodiment of the present invention shown in FIGS. 1 and 2.
Figure 6:
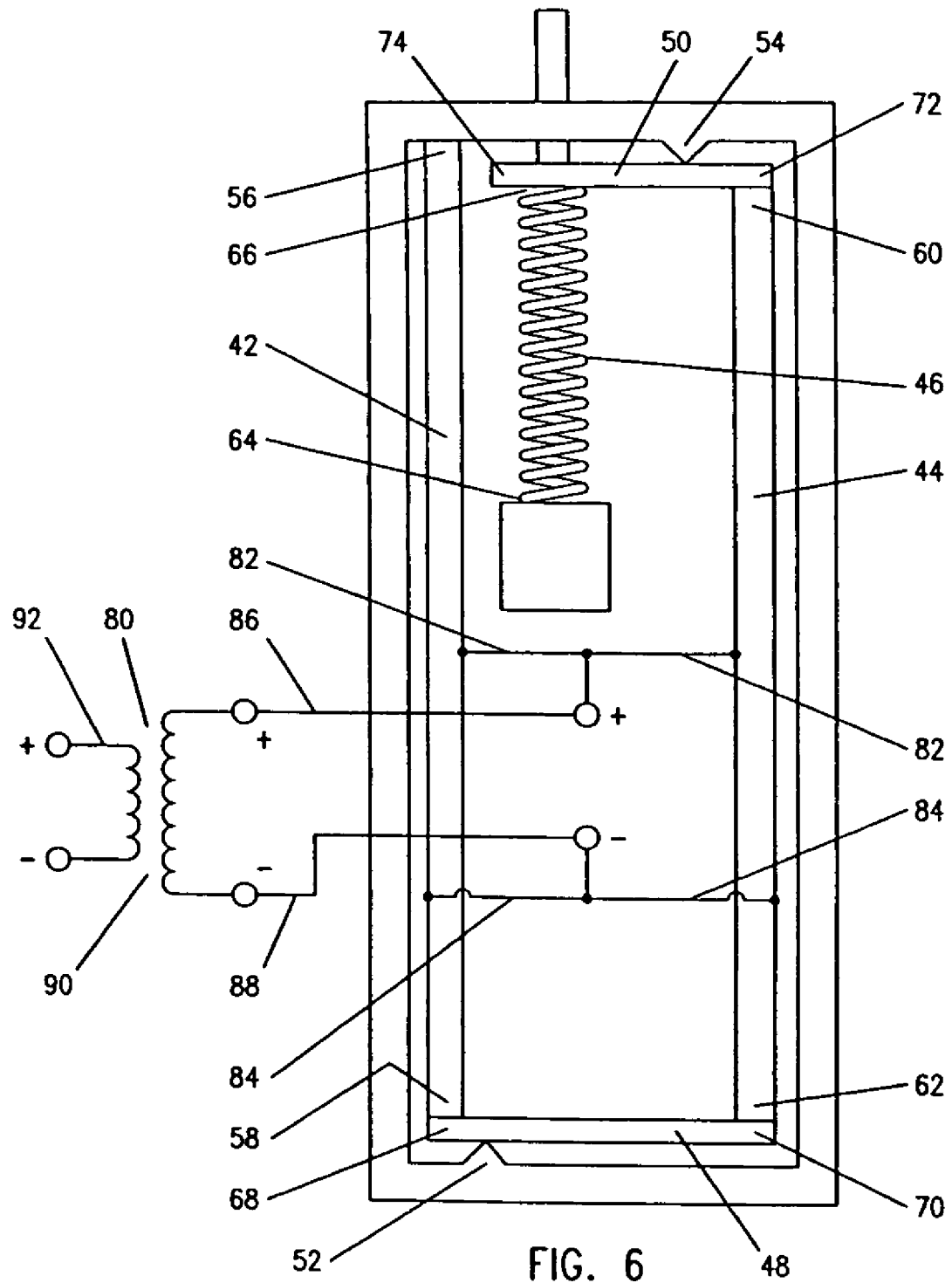
FIG. 6 is an electrical schematic illustrating the apparatus utilized to apply an electrical field to the piezoelectric elements utilized in the embodiment of the present invention shown in FIGS. 3 and 4.

Referring now to FIGS. 5 and 6, an electrical schematic illustrating the apparatus, shown generally by the numeral 80, utilized to apply an electrical field to the piezoelectric element(s) 12 or 42, 44, in the d31 operating mode, is shown. As illustrated, electrodes 82, 84 are oppositely disposed along the longitudinal axis of the piezoelectric element(s) 12 or 42, 44. Electrical conductors 86, 88 are connected to electrodes 82, 84, respectively, permitting a voltage to be applied thereto. The voltage may be provided by an electrical transformer 90 having a primary coil 92 and a secondary coil 94 which is connected across the conductors 86, 88 to increase the voltage applied to the electrodes 82, 84, and thus, to the piezoelectric element(s) 12 or 42, 44.

The present invention can be utilized in numerous diverse applications. For example, the piezoelectric actuator of the present invention can be utilized in precision robotic applications or applications that require precise alignment of various components or devices, such as the alignment of mirrors. Also, the present invention can be utilized where precise control of the operation of various devices is required, such as the operation of automotive fuel injectors, gas valves, fluid control valves, etc. The foregoing applications are not to be construed as being all inclusive, but are merely examples of the numerous applications in which the piezoelectric actuator of the present invention can be employed.

Certain modifications and improvements will occur to those skilled in the art upon reading the foregoing. It is understood that all such modifications and improvements have been deleted herein for the sake on conciseness and readability, but are properly within the scope of the following claims.

I claim:

1. A piezoelectric actuator comprising a housing, a piezoelectric member having a first end in contact with said housing and having [a] an oppositely disposed second end, a spring member having a predetermined compressive force applied thereto and having a first end in contact with said housing and having [a] an oppositely disposed second end, a connecting member having a first end contacting said second end of said piezoelectric member and having [a] an oppositely disposed second end contacting said second end of said spring member, pivot means contacting said connecting means intermediate said first end and said second end of said connecting member permitting said connecting means to rotate about said pivot means, said piezoelectric member being electrically poled with dipoles aligned substantially perpendicular to the longitudinal axis of said piezoelectric member, and means for applying an electric field substantially perpendicular to said longitudinal axis of said piezoelectric member, application of said electric field to said piezoelectric member causing said piezoelectric member to contract along said longitudinal axis permitting said connecting member to rotate about said pivot means allowing said spring member to release said predetermined compressive force applied thereto.

2. The actuator as defined in claim 1 wherein said piezoelectric member is comprised of two substantially concentric circular rings forming a hollow tubular structure.

3. The actuator as defined in claim 1 wherein said piezoelectric member is comprised of two substantially concentric polygons forming a hollow structure having a generally uniform wall thickness.

4. The actuator as defined in claim 1 wherein said piezoelectric member is comprised of two substantially concentric polygons forming a hollow structure having a generally non-uniform wall thickness.

5. The actuator as defined in claim 1 wherein said electric field applying means comprises electrodes oppositely disposed along said longitudinal axis of said piezoelectric member.

6. The actuator as defined in claim 1 further including electrical conductors connected to said electric field applying means permitting an electrical voltage to be applied to said electrical field applying means.

7. The actuator as defined in claim 6 further including an electrical transformer having a primary coil and a secondary coil, said secondary coil being connected to said electrical conductors to increase the electrical voltage applied to said piezoelectric member by said electric field applying means.

8. A piezoelectric actuator comprising a housing, a plurality of piezoelectric members each having a first end and [a] an oppositely disposed second end, a spring member having a predetermined compressive force applied thereto and having a first end in contact with said housing and having [a] an oppositely disposed second end, a first piezoelectric member of said plurality of piezoelectric members having its said first end in contact with said housing, a first connecting member having a first end contacting said second end of said first piezoelectric member and having [a] an oppositely disposed second end, a second piezoelectric member of said plurality of piezoelectric members having its said first end contacting said second end of said first connecting member, first pivot means contacting said first connecting member intermediate said first end and said second end of said first connecting member permitting said first connecting member to rotate about said first pivot means, a second connecting member having a first end contacting said second end of said second piezoelectric member and having [a] an oppositely disposed second end contacting said second end of said spring member, second pivot means contacting said second connecting member intermediate said first end and said second end of said second connecting member permitting said second connecting member to rotate about said second pivot means, said first and second piezoelectric members being electrically poled with dipoles aligned substantially perpendicular the longitudinal axis of each of said first and second piezoelectric members, and means for applying an electric field substantially perpendicular to said longitudinal axis of said first and second piezoelectric members, application of said electric field to said first and second piezoelectric members causing said first and second piezoelectric members to contract along their respective longitudinal axis permitting said first and second connecting members to rotate about their respective said first and second pivot means allowing said spring member to release said predetermined compressive force applied thereto.

9. The actuator as defined in claim 8 wherein at least one piezoelectric member of said plurality of piezoelectric members is comprised of two substantially concentric rings forming a hollow tube configuration.

10. The actuator as defined in claim 8 wherein at least one piezoelectric member of said plurality of piezoelectric members is comprised of two substantially concentric polygons forming a hollow structure having a generally uniform wall thickness.

11. The actuator as defined in claim 8 wherein at least one piezoelectric member of said plurality of piezoelectric members is comprised of two substantially concentric polygons forming a hollow structure having a generally non-uniform wall thickness.

12. The actuator as defined in claim 8 wherein said electric field applying means comprises electrodes oppositely disposed along said longitudinal axis of said first and second piezoelectric members.

13. The actuator as defined in claim 8 further including electrical conductors connected to said electric field applying means permitting an electrical voltage to be applied to said electrical field applying means.

14. The actuator as defined in claim 8 further including an electrical transformer having a primary coil and a second coil, said secondary coil being connected to said electrical conductors to increase the electrical voltage applied to said first and second piezoelectnc members by said electric field applying means.

* * * * *